June 24, 1924.
W. V. OSBORNE
LUGGAGE CARRIER
Filed Nov. 30, 1921
1,498,569
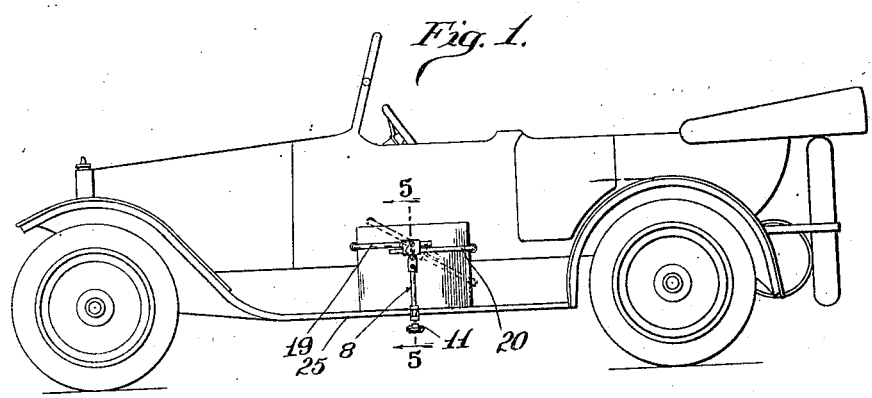
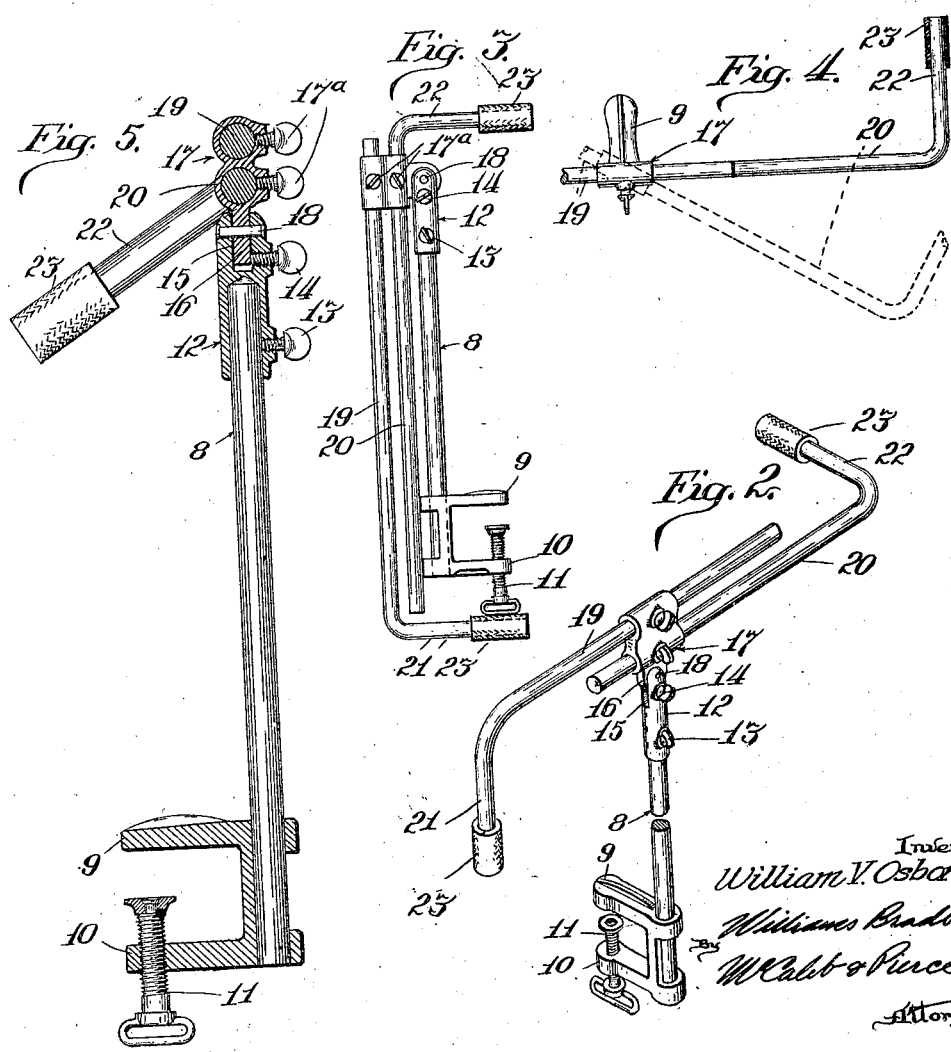
Inventor.
William V. Osborne Patented June 24, 1924.

1,498,569

UNITED STATES PATENT OFFICE.

WILLIAM V. OSBORNE, OF RACINE, WISCONSIN.

LUGGAGE CARRIER.

Application filed November 30, 1921. Serial No. 518,815.

*To all whom it may concern:*

Be it known that I, WILLIAM V. OSBORNE, a citizen of the United States, and resident of Racine, in the county of Racine and State of Wisconsin, have invented a certain new and useful Improvement in Luggage Carriers, of which the following is a full, clear, concise, and exact description, reference being had to the accompanying drawings, forming a part of this specification.

My invention relates to luggage carriers and particularly to that class of devices of this kind which are attachable to the running board or other portion of an automobile for the purpose of conveniently carrying various kinds of luggage.

The objects of my invention are:

First, to provide a device of this kind that is attachable to the running board of an automobile to hold securely luggage carried on the running board.

Second, to provide a luggage carrier that is quickly attachable or detachable;

Third, to provide a device of the class described that is light and strong in construction and cheaply manufactured;

Fourth, to provide a luggage carrier which is adjustable to support and embrace luggage to be carried to prevent the same from moving about, thereby preventing mutilation of the luggage and the automobile body;

Fifth, to provide a device which is collapsible into a form requiring little space and one that may be stored conveniently.

The construction of the device and the foregoing and other objects will be apparent by reference to the following specification and accompanying drawings, in which—

Figure 1 is a side elevational view of an automobile provided with a luggage carrier of my invention;

Figure 2 is a perspective view of the device;

Figure 3 is an elevational view of the device in collapsed form;

Figure 4 is a fragmentary view in elevation of a portion of the device;

Figure 5 is a sectional view taken on the line 5—5 of Fig. 1.

Similar characters of reference refer to similar parts throughout the several views.

Referring to the drawings, the device consists of a main support 8 having secured thereto at one end a clamp comprising a pair of parallel arms 9 and 10 extending from the support 8. A screw 11 operating within the clamp arm 10 is adapted to co-operate with the clamp arm 9 to embrace the running board or other portion of the vehicle to hold the device in a fixed position. Rotatably mounted on the support 8 by means of threads or otherwise, is a sleeve 12 provided with set screws 13 and 14. As best shown in Figs. 2 and 5, the sleeve 12 is bifurcated at 15 to receive the portion 16 of a holder 17. The holder 17 is pivotally supported within the bifurcation 15 by means of a pin 18 extending through the arms of the sleeve 12 and the portion 16. Slidably disposed within the holder 17 is a pair of rods 19 and 20 bent to form the arms 21 and 22, respectively, to embrace and engage luggage to be carried. Screw threaded in the holder 17 is a pair of set screws 17$^a$ adapted to engage the rods 19 and 20 and to hold them in a desired fixed position.

Each of the arms 21 and 22 may, if desired, be provided with rubber shoes 23—23 to prevent mutilation of the articles being carried. In use, the device may be secured to the running board 25 of an automobile by means of the clamping screw 11, and if it is desired to carry a box of the shape illustrated in Fig. 1, the arms 19 and 20 are adjusted to extend at substantially right angles to the support 8 and adjusted within the holder 17 to embrace and engage the box. When the device is thus secured to the running board and the arms 21 and 22 embrace the box, the set screw 13 is tightened to prevent rotation of the sleeve 12 upon the support 8, and the set screw 14 is brought to bear against the portion 16, whereby rotation of the holder 17 is prevented. In the same manner set screws 17$^a$ are operated to engage the rods 19 and 20 which are thus held in the desired position to prevent the box being carried from moving about and mutilating itself and the automobile body.

If it is desired to carry luggage smaller at one end than at the other, the holder 17 may be rotated to the position illustrated in dotted lines in Fig. 1.

In the event that the luggage to be carried extends throughout the length of the running board or beyond the capacity of one of the carriers, two of my devices may be used. In this case one of the arms 21 or 22 may extend downwardly along the side of the luggage and the other arm may extend inwardly toward the automobile to embrace the articles being carried. When two devices are used, two arms engage opposite ends of the luggage and the other two arms extend downwardly to serve as supports.

If it is desired to carry a box which extends over the side of the running board, the two devices may be clamped to the running board adjacent the ends of the box and the rods 19 and 20 adjusted to extend at right angles to the position shown in Fig. 1. The box may then protrude between the supports 8 beyond the edge of the running board, and the arms 21 and 22, in each instance, are adjusted to embrace the sides of the box being carried to hold the same in place.

I am aware that in some instances it may be desirable to clamp the support 8 to the body or to portions of the vehicle other than the running board to secure the luggage in fixed position. The device is also adaptable for carrying pipe and other material by clamping the support 8 in fixed position and extending the arms 21 and 22 to a vertical position. The material may then rest on the rods 19 and 20 between the arms 21 and 22.

As illustrated in Figure 3, when the device is not in use, it is collapsible into a form requiring but little space, the holder 17 being rotated so that the arms 19 and 20 lie adjacent the support 8 and the free end of the rod 19 brought into substantial engagement with the arm 22.

Having thus described my invention, what I claim is:

1. A luggage carrier comprising a support, a clamp on said support, a sleeve rotatably mounted on said support, a holder pivoted in said sleeve, and a pair of rods slidably supported in said holder and arranged to engage an article to be carried.

2. A device of the class described comprising a support, a clamp comprising a pair of arms extending from the support and secured thereto, a screw operable within one of said arms and arranged to embrace a base between it and the other of said arms, a bifurcated sleeve rotatably mounted on the support, a holder pivoted in said bifurcation, means to retain said holder in fixed position, an arm slidably disposed in said holder, and means to retain the arm in fixed position, said arm being bent to embrace and engage an article to be supported.

3. A device of the class described comprising a support, a clamp, a bifurcated sleeve rotatably mounted on the support, a holder pivoted in said bifurcation, means to retain said holder in fixed position, an arm slidably disposed in said holder, and means to retain the arm in fixed position, said arm being bent to embrace and engage an article to be supported.

4. A luggage carrier comprising a support, a clamp comprising a pair of arms extending from the support and secured thereto, a screw operable within one of said arms, a sleeve rotatably mounted on the support, a holder pivoted in said sleeve, means to retain said holder in fixed position, an arm slidably disposed in said holder, and means to retain the arm in fixed position, said arm being bent to embrace and engage an article to be supported.

5. A luggage carrier comprising a support, a clamp comprising a pair of arms extending from the support and secured thereto, a screw operable within one of said arms, a sleeve rotatably mounted on the support, a holder pivoted in said sleeve, and an arm slidably disposed in said holder, said arm being bent to embrace and engage an article to be supported.

6. A luggage carrier comprising a support, a clamp, a sleeve rotatably mounted on the support, a holder pivoted in said sleeve, and an arm slidably disposed in said holder, said arm being bent to embrace and engage an article to be supported.

7. In a luggage carrier adapted to be secured to a vehicle, a support, a clamp therefor, a rotatable member mounted on the support and having its axis parallel to the axis of the support, means to hold the rotatable member in fixed position, a holder pivoted in said rotatable member and adapted to rotate in the plane in which the axis of the rotatable member lies, a pair of arms slidably supported by the holder, and means to hold the slidable arms in fixed position, said arms being bent and adapted to embrace luggage to be carried.

8. In a luggage carrier adapted to be secured to a vehicle, a support, a clamp therefor, a rotatable member mounted on the support and having its axis parallel to the axis of the support, a holder pivoted in said rotatable member, and adapted to rotate in the plane in which the axis of the rotatable member lies, a pair of arms slidably supported by the holder, and means to hold the slidable arms in fixed position, said arms being bent and adapted to embrace luggage to be carried.

9. A luggage carrier comprising a support, a clamp therefor, a rotatable member mounted on the support and having its axis parallel to the axis of the support, a holder pivoted on said rotatable member and adapted to rotate in the plane in which the axis of the rotatable member lies, and a pair of arms slidably supported by the holder.

10. A luggage carrier comprising a support, a rotatable member mounted on said support, a holder rotatably mounted in said rotatable member, and an arm slidably disposed in said holder.

In witness whereof, I hereunto subscribe my name this 26th day of November, 1921.

WILLIAM V. OSBORNE.

Witnesses:
EDNA V. GUSTAFSON,
ALBIN C. AHLBERG.